United States Patent [19]
Uroshevich

[11] 4,278,074
[45] Jul. 14, 1981

[54] FLAT PLATE SOLAR COLLECTOR

[75] Inventor: Miroslav Uroshevich, Cincinnati, Ohio

[73] Assignee: Alpha Solarco Inc., Cincinnati, Ohio

[21] Appl. No.: 52,080

[22] Filed: Jun. 25, 1979

[51] Int. Cl.³ .................................. F24J 3/02
[52] U.S. Cl. ...................... 126/444; 126/450
[58] Field of Search .............. 126/450, 449, 901, 448, 126/444, 446, 447; 252/62

[56] References Cited
U.S. PATENT DOCUMENTS

| | | | |
|---|---|---|---|
| 3,951,834 | 4/1976 | Gillian | 252/62 |
| 4,046,135 | 9/1977 | Root | 126/450 |
| 4,120,288 | 10/1978 | Barrett | 126/450 |
| 4,135,490 | 1/1979 | Soleau | 126/450 |

*Primary Examiner*—Carroll B. Dority, Jr.
*Assistant Examiner*—G. Anderson
*Attorney, Agent, or Firm*—Gary M. Gron

[57] ABSTRACT

The disclosure illustrates a flat plate solar collector comprising a vacuum formed tray, of low conductivity material, such as ABS, of sufficient thickness to form a structural support. A layer of glass beaded foam is placed in the tray. A receiver of layers of thin copper with heat transfer fluid passages is positioned over the glass beaded foam. Single or double glass glazing is provided to cover the tray and reduce heat losses. Foam insulating material on the outside of the tray further minimizes heat losses. The receiver and glass beaded insulating material are secured to the tray which forms a low cost, easily manufacturable structural base for the collector.

3 Claims, 1 Drawing Figure

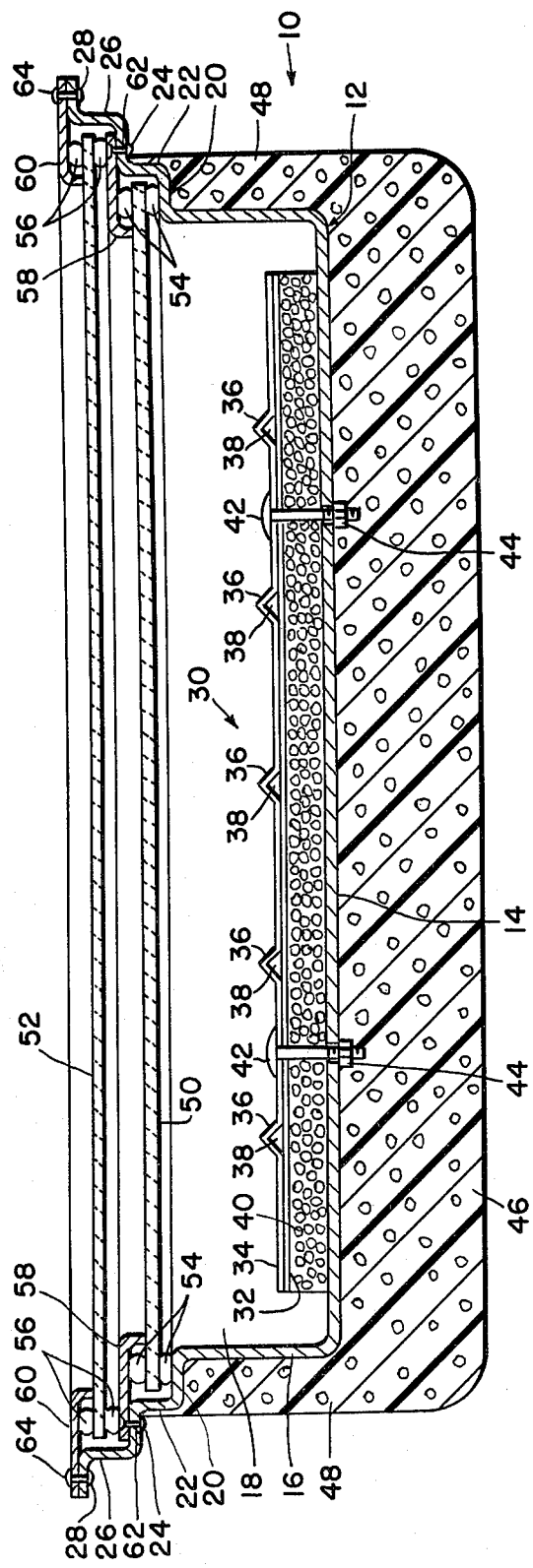

FLAT PLATE SOLAR COLLECTOR

The present invention relates to solar collectors and more specifically to flat plate solar collectors.

The flat plate collector has been proposed for many applications because of its simplicity, chiefly because it does not have to be continually re-oriented to face the sun as it travels through the sky each day.

Many different types of flat plate collectors have been designed, each with the object of being lower in cost and higher in performance. Examples of such collectors may be found in U.S. Pat. Nos. 4,091,793; 4,094,301; 4,120,288; 4,138,991, and 4,140,103. Generally these patents disclose a collector comprising a plate like receiver mounted within a trough of insulating material and covered by one or two panes of glass.

One of the problems facing the designer of flat plate collectors such as the ones described above is the proper support of the solar receiver. It is made of heat conductive material such as copper, which is a relatively soft material to begin with. In order to reduce thermal interia, and to minimize the cost, the copper is made as thin as possible, consistent with the fluid pressures it must withstand. As a consequence it is a flimsy material not capable of self-support. Although the insulating material commonly used to support the receiver will somewhat serve this purpose, after assembly is completed, it does not support the receiver during manufacture.

The above problems are solved by a flat plate solar collector which comprises a tray formed from low heat conductivity material of sufficient thickness to form a structural element. A layer of relatively thin heat conductive and solar radiation absorbing material is secured to said tray so that they tray provides structural support for the thin material.

The above and other related features of the present invention will be apparent from a reading of the following disclosure shown in the accompanying drawing and the novelty thereof pointed out in the appended claims.

In the drawing:

The single FIGURE shows a cross-section view of a flat plate collector embodying the present invention.

The FIGURE shows a flat plate collector 10 comprising a tray 12, preferably formed from resin material having a relatively low thermal conductivity, such as ABS. This material may be vacuum formed to take advantage of high volume, low cost manufacturing techniques. Tray 12 comprises a floor 14 and integral walls 16, 18. The components of tray 12 are made sufficiently thick so that they are capable of serving a structural function. The upper part of walls 16, 18 include an integral flange 20 and rim 22 to form a first perimeter frame for tray 12. A second flange 24 extends from rim 22 and a rim 26 and flange 28 extends from flange 24 to form a second perimeter frame for tray 12 which is spaced upwardly from the frame formed by flange 20 and rim 22.

A flat plate receiver 30 is positioned within tray 12 and comprises a pair of sheets 32, 34 of high thermal conductivity material, such as copper. As illustrated, sheet 34 contains a plurality of V-grooves 36 which form, in combination with the opposing sheet 32, a series of passages 38 for carrying heat transfer fluid. The heat transfer fluid is circulated through passages 38 by a suitable pump and passageway network (not shown) to provide a useable thermal output in response to solar radiation striking receiver 30. It is desirable that the outer facing surface of sheet 34 be coated with a darkening material such as black chrome which is well known in the solar energy field.

Preferably the receiver 30 is positioned over a plate 40 of insulating material such as a glass beaded foam which has an extremely low heat transfer coefficient.

The receiver 30 is secured to the tray floor 14 by a fastening device such as one or more screws 42 and nuts 44.

A layer of insulating material, such as expanded urethane foam, is formed around the exterior of tray 12 in the form of a floor 46 and side walls 48. With this type of material it is convenient to foam it in place so that it adheres to the surface of tray 12.

First and second glass panes 50, 52 are received within the first and second perimeter frames. Suitable perimeter seals 54, 56 provide an air tight connection. Retaining frames 58 and 60 are secured to flanges 24, 28 by fasteners 62, 64 to hold the glass panes in place.

Both during manufacture and in service the tray 12 forms a structural base for the entire solar collector. As a result the receiver 30 may be made from material that is extremely thin and is just strong enough to support any pressure loads within passages 38. As a result, any thermal interia within the receiver 30 is minimized.

The tray 12 is economically formed on a mass production basis to enable low cost but precisely manufactured solar collectors.

While a preferred embodyment of the present invention has been disclosed, it should be apparent to those skilled in the art that it may be practical in other forms without departing from the spirit and scope thereof.

Having thus disclosed the invention, what is claimed as novel and desired to be secured by letters patent of the United States is:

1. A flat plate solar collector comprising:
    a tray formed from low heat conductivity, vacuum formed sheet material of sufficient thickness to form a structural element, said tray including a substantially planar floor portion, integral upstanding, flat wall portions, a flange rim integral with said wall portions and forming a first perimeter frame around said tray, said first perimeter frame including a first outwardly directed flange integral with said first upstanding rim and a second upstanding rim integral with said second outwardly directed flange;
    a first pane of glass received in said first perimeter frame and a second pane of glass received in said second perimeter frame to minimize heat losses;
    a plate of glass beaded foam insulating material positioned over said planar floor portion;
    a layer of relatively thin heat conductive and solar radiation absorbing material positioned on said floor portion of said tray only in direct contact with said glass beaded foam insulating material, said layer being co-extensive with said plate and spaced from said wall portions, said heat conductive material comprising first and second sheets sandwiched together, said sheets having grooves formed therein to form a system of heat transfer fluid passages; and
    means extending through said heat conductive material and said glass beaded foam material for securing thin heat conductive material.

2. Apparatus as in claim 1 wherein said sheets are made of copper, the sheet facing incoming solar radiation being coated with black chrome.

3. Apparatus as in claim 2 further comprising an insulating layer of expanded foam material on the outer walls of said tray.